US005872783A

United States Patent [19]
Chin

[11] Patent Number: 5,872,783
[45] Date of Patent: Feb. 16, 1999

[54] ARRANGEMENT FOR RENDERING FORWARDING DECISIONS FOR PACKETS TRANSFERRED AMONG NETWORK SWITCHES

[75] Inventor: Hon Wah Chin, Palo Alto, Calif.

[73] Assignee: Cisco Systems, Inc., San Jose, Calif.

[21] Appl. No.: 686,106

[22] Filed: Jul. 24, 1996

[51] Int. Cl.⁶ ............................................. H04J 3/24
[52] U.S. Cl. ..................... 370/392; 370/395; 370/401
[58] Field of Search ............................. 370/236, 351, 370/352, 392, 395, 396, 397, 399, 255, 401, 402, 409

[56] References Cited

U.S. PATENT DOCUMENTS

| | | | |
|---|---|---|---|
| 5,243,342 | 9/1993 | Kattemalalavadi et al. | 341/106 |
| 5,353,283 | 10/1994 | Tsuchiya | 370/392 |
| 5,394,402 | 2/1995 | Ross | 370/402 |
| 5,426,637 | 6/1995 | Derby et al. | 370/85.13 |
| 5,452,294 | 9/1995 | Natarajan | 370/351 |
| 5,500,860 | 3/1996 | Perlman et al. | 370/85.13 |
| 5,519,704 | 5/1996 | Farinacci et al. | 370/402 |
| 5,555,256 | 9/1996 | Calamuokis | 370/399 |
| 5,561,669 | 10/1996 | Lenney et al. | 370/352 |
| 5,623,492 | 4/1997 | Teraslinna | 370/397 |
| 5,650,993 | 7/1997 | Lakshman | 370/236 |
| 5,651,002 | 7/1997 | Van Seters et al. | 370/392 |

OTHER PUBLICATIONS

P. Newman et al., "Ipsilon Flow Management Protocol Specification for Ipv4 Version 1.0," Internet Community's Request for Comments No. 1953, (May 1996).

M. Perez et al., "ATM Signaling Support for IP over ATM," Internet Community's Request for Comments No. 1755, (Feb. 1995).

J. Heinanen, "Multiprotocol Encapsulation over ATM Adaptation Layer 5," Internet Community's Request for Comments No. 1483, (Jul. 1993).

M. Laubach, "IP over ATM Working Group's Recommendations for the ATM Forum's Multiprotocol BOF Version 1," Internet Community's Request for Comments No. 1754, (Jan. 1995).

M. Laubach, "Classical IP and ARP over ATM," Internet Community's Request for Comments, No. 1577, (Jan. 1994).

Martin de Prycker, *Asynchronous Transfer Mode Solution for Broadband ISDN*, Prentice Hall, 1995, pp. 5–11, 87–90.

D. Ginsburg, *ATM Solutions for Enterprise Internetworking*, Addison–Wesley Longman 1996, pp. xv–xiv, 36–41, 72–76.

R. Ullmann, "Rap: Internet Route Access Protocol," Internet Community's Request for Comments No.1476, (Jun. 1993).

M. McGovern, et al., "CATNIP: Common Architecture For The Internet," Internet Community's Request for Comments No. 1707, (Oct. 1994).

S. Deering, et al., "Internet Protocol, Version 6," Internet Community's Request for Comments No. 1883, (Dec. 1995).

(List continued on next page.)

*Primary Examiner*—Douglas W. Olms
*Assistant Examiner*—Shick Hom
*Attorney, Agent, or Firm*—Cesari and McKenna, LLP

[57] ABSTRACT

An arrangement facilitates rendering of a forwarding decision for a packet transferred between high-speed switches of a network using a path identifier (PTID) encapsulated within the packet. The PTID is a tag associated with a destination address of the packet and comprises a value that uniquely identifies a corresponding entry of a forwarding table of the switch. Rather than requiring a full compare of the destination address with the contents of the forwarding table, the PTID is used as a direct index address into the table that identifies the corresponding entry in a fast and efficient manner.

16 Claims, 8 Drawing Sheets

OTHER PUBLICATIONS

Information Technology—Telecommunications And Information Exchange Between Systems—Protocol For Exchange Of Inter–Domain Routeing Information Among Intermediate Systems To Support Forwarding Of ISO 8473 PDU's, *International Standard ISO/IEC*, Oct. 1, 1994.

Amendment 1, International Standard ISO/IEC, (Oct. 1, 1995).

K. Nagami et al., "Toshiba's Flow Attribute Notification Protocol (FANP) Specification," Internet Community's Request for Comments No. 2129, (Apr. 1997).

Y. Katsube et al., "Toshiba's Router Architecture Extensions for ATM: Overview," Internet Community's Request for Comments No. 2098, (Feb. 1997).

A. Viswanathan et al., "ARIS: Aggregate Route–Based IP Switching," Internet Draft, (Mar. 1997).

P. Newman et al., "Ipsilon's General Switch Management Protocol Specification Version 1.1," Internet Community's Request for Comments No. 1987, (Aug. 1996).

N. Feldman, "ARIS Specification" Internet Draft, (Mar. 1997).

"ISDN Data Link Layer Specification for Frame Mode Bearer Services," CCITT Recommendation Q.922, International Telecommunication Union, Geneva, 1992.

"Digital Subscriber Signalling System No. 1 (DSS 1)—Signalling Specification for Frame Mode Basic Call Control," ITU–T Recommendation Q.933, International Telecommunication Union, Geneva, 1994.

G. P. Chandranmenon and G. Varghese, "Trading Packet Headers for Packet Processing," Proc. ACM SIGCOMM '95, Boston, MA, Sep. 1995, pp. 162–173.

| INBOUND TABLE | | | | |
|---|---|---|---|---|
| PRIORITY + VLAN 402 | DA 404 | OUTBOUND PORT INFO 405 | NEXT HOP 406 | INTERNAL ptid 408 |
| | | | | |
| | ... | | | |
| | | | | |
| | | | | |

FIG. 6C

ARRANGEMENT FOR RENDERING FORWARDING DECISIONS FOR PACKETS TRANSFERRED AMONG NETWORK SWITCHES

FIELD OF THE INVENTION

This invention relates generally to computer network switches and, more particularly, to a technique for efficiently rendering forwarding decisions with respect to packets transferred among high-speed switches of a network.

BACKGROUND OF THE INVENTION

A network switch of a data communications network provides a "switching" function for transferring information among entities of the network. Typically, the switch is a computer comprising a collection of ports interconnected by a switching fabric circuit. Each port couples the switch to a network entity over any of various types of media, including Ethernet, FDDI or token ring local area network (LAN) connections. A network entity may consist of any device, such as an end station or switch, that "sources" (i.e., transmits) or "sinks" (i.e., receives) information over the media.

The switching function provided by the LAN switch generally comprises receiving information at an input port from a network entity, forwarding that information to at least one other output port via the switching fabric and, thereafter, transmitting the information over at least one medium to another entity of the network. The information are typically forwarded among the ports by the switching fabric as a plurality of fixed-length data elements or packets. Each packet contains, inter alia, a 48-bit media access control (MAC) source address identifying the source network address of the packet and a 48-bit MAC destination address that identifies the destination network address of that packet.

Typically, forwarding decisions pertaining to output ports of a LAN switch selected to receive an input packet are rendered in accordance with routing information contained in a forwarding table of the switch. The switch uses the 48-bit destination address of the packet to "look-up" an appropriate entry of the table specifying the selected output ports for receiving the packet. The look-up operation generally comprises a full destination address compare with all entries of the table. With LAN speeds approaching 1 gigabits per second (Gb/s), use of such look-up techniques to render forwarding decisions on a forwarding table having 1 thousand (K) to 32K entries is time consuming.

In the case of an asynchronous transfer mode (ATM) switch, the information is forwarded among the ports as a plurality of fixed-length data elements or cells. Each cell is 53 bytes in length and consists of a 5-byte header field appended to a 48-byte data field. The header field contains routing and other address information, e.g., a virtual path identifier (VPI) and a virtual channel identifier (VCI), for the cell that the switch associates with the destination of the packet prior to transmission over the network.

For example, the VPI/VCI pair is used in connection with forwarding decisions made by the ATM switch for packets transferred at LAN speeds in the 100–155 Mb/s range. Specifically, the VPI/VCI is employed as a direct index into the forwarding table of the switch; such use obviates the fill destination address compare operation employed by a typical LAN switch. However, a complex protocol requiring extensive software overhead, e.g., ATM LANE, is generally used to assign and map the VPI/VCI to the destination address of the packet. This ATM approach further requires generation of a large number of entries in the forwarding table having established "connections" before engaging in data transfer operations.

The present invention is directed to enabling switches to provide forwarding decisions for packets processed at LAN speeds approaching 1 Gb/s, without the software complexity associated with ATM protocols.

SUMMARY OF THE INVENTION

The invention comprises a novel arrangement that facilitates rendering of forwarding decisions for a packet transferred between high-speed switches of a network using a path identifier (PTID) encapsulated within the packet. The PTID is preferably a tag associated with a destination address of the packet and comprises a value that uniquely identifies a corresponding entry of a forwarding table of the switch. Rather than requiring a fill look-up of the destination address within the contents of the forwarding table, the PTID is used as a direct index address into the table that identifies the corresponding entry in a fast and efficient manner.

According to an aspect of the invention, the PTID is assigned solely by a switch configured to interpret the PTID tag. That is, an interpreting switch generates and appends an assigned PTID to a packet prior to forwarding it to a learning switch. In response to receipt of the packet, the learning switch "learns" and associates both the destination address and the assigned PTID with the interpreting switch, preferably under control of a central processing unit (CPU) of the switch. Thereafter, all packets forwarded by the learning switch to the interpreting switch are encapsulated with the assigned PTID tag. This feature of the invention advantageously allows each switch interpreting a PTID to efficiently manage the size of its forwarding tables and the overhead needed to establish destination address associations. Notably, each PTID tag is associated with a single destination address.

In the illustrative embodiment, the forwarding table logically comprises an inbound table portion and an outbound table portion. The inbound table is associated with an input port of the switch and includes a plurality of entries, each having a plurality of fields. These inbound table entry fields contain, inter alia, a destination address associated with the PTID, outbound port information and, a new ptid tag, marked as either internal or external, as appropriate. The outbound port information specifies the output port(s) of the switch selected to receive a packet via a switching fabric circuit.

According to another aspect of the invention, the internal ptid tag is used as a direct index address into the outbound table associated with an output port of the switch, whereas the external ptid tag is used for tagging a packet destined to another interpreting switch, i.e., the "next hop". The external ptid tag is typically different from the internal ptid tag and, significantly, not re-translated via the outbound table. Internal ptid tags, on the other hand, are typically employed where a packet is destined for multiple output ports; in this case, the ptid tags decouple indexing into the outbound tables of the selected ports from addressing of the inbound table in the event that a copy of the packet destined for one of the output ports has been assigned a new PTID tag by its interpreting switch that is different from the tag assigned to another copy of the packet by another interpreting switch. The outbound table portion also includes a plurality of entries, each of which contains at least one field for storing the new PTID tag assigned by the interpreting switch destined to receive the packet.

In operation, the PTID tag is extracted by a switch and used to address a corresponding entry of its inbound table in response to receiving an encapsulated packet at an input port. The destination address contents of table entry are compared with the destination address of the packet and, if they match, the outbound port information is used by the switching fabric circuit to deliver the packet to the appropriate output port. If the packet is a multi-destination packet destined for multiple output ports, each internal ptid tag is used to encapsulate a copy of the packet provided to each port. The internal ptid tag is extracted from the packet by the output port and used to identify an entry of the outbound table containing a new PTID tag; this latter tag is appended to the packet prior to forwarding onto the network.

In an alternate embodiment of the invention, an additional memory element is provided at the switch to facilitate rendering of a forwarding decision at an input port for a packet having a destination address known to the CPU, but "unknown" by the input port. This packet is unknown primarily because it has not yet been assigned a PTID tag by its interpreting switch. Here, the memory element is preferably a content addressable memory (CAM) having a predetermined number of entries, each of which contains fields for storing information similar to that stored in the inbound table entries. A full destination address compare is performed with all entries of the CAM when the PTID of a packet is unknown to the input port; this function preferably occurs as part of the learning process.

If there is match of destination addresses, the outbound port information and, if appropriate, the internal ptid tag(s) are used as described above; otherwise, the destination of the packet is treated as unknown and the packet is flooded to all output ports. Each time an unknown destination of a packet is resolved, the contents of the CAM are updated by the CPU in accordance with a conventional "aging" policy.

In yet another embodiment, an independent out-of-band data path, e.g., a data structure, is provided for transferring "learning" information to the CPU. This data structure is separate and distinct from the in-band switching fabric circuit used to forward typical CPU-destined packets. The out-of-band data structure may comprise, e.g., a FIFO or queue, which the CPU periodically polls or which interrupts the CPU when there is learning information that affects the contents of a table.

BRIEF DESCRIPTION OF THE DRAWINGS

The above and further advantages of the invention may be better understood by referring to the following description in conjunction with the accompanying drawings, in which like references indicate similar elements, and in which.

DETAILED DESCRIPTION OF ILLUSTRATIVE EMBODIMENT

Figure 1:
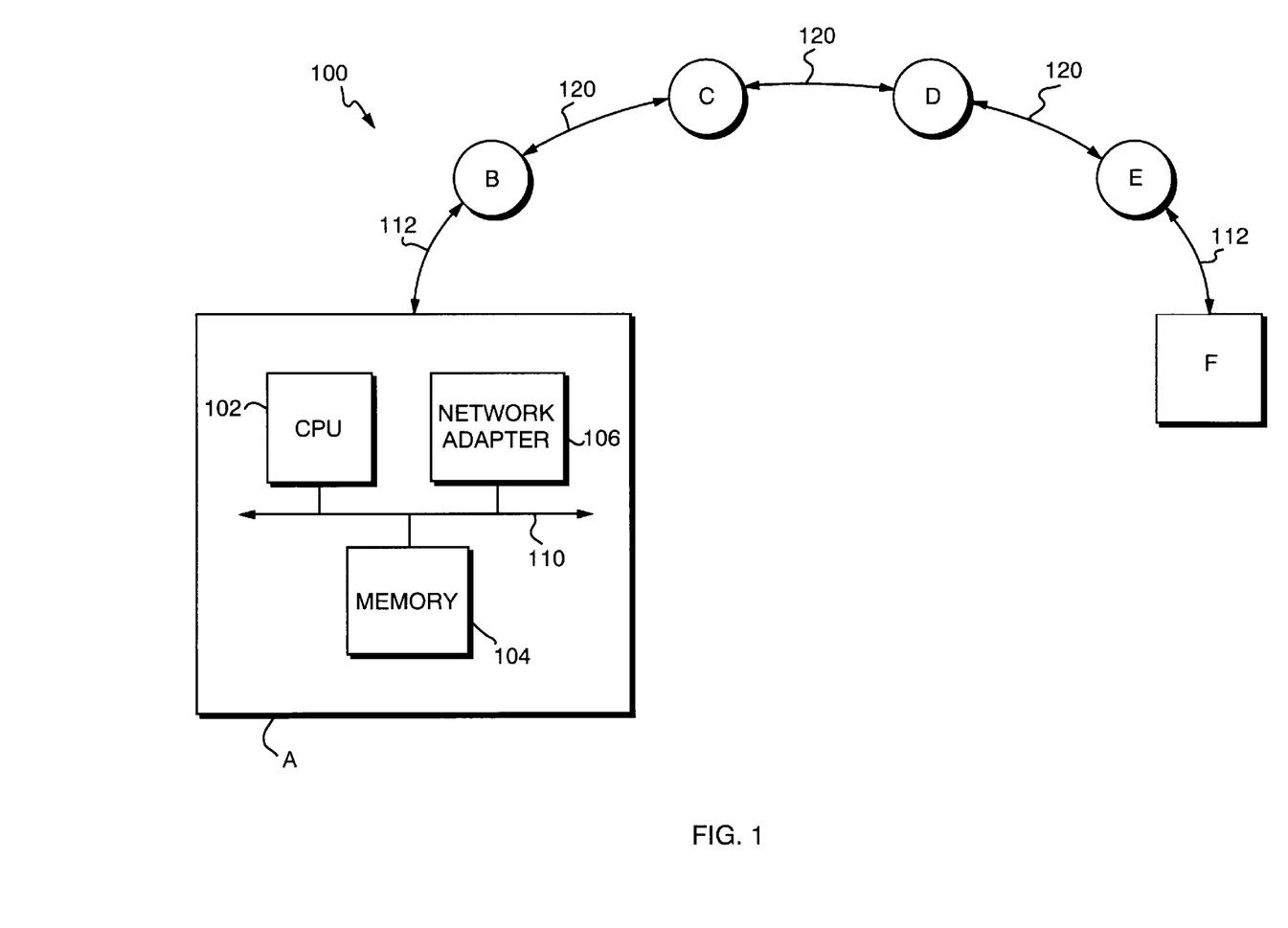
FIG. 1 is a schematic block diagram of a network system comprising a collection of computer network media connected to a plurality of network entities, such network switches.

FIG. 1 is a schematic block diagram of a network system 100 comprising a collection of computer network media connected to a plurality of network entities. The entities are typically general-purpose computers with customized support logic circuits comprising a source end station A, a destination end station F and a plurality of intermediate switches B–E. Each entity typically comprises a central processing unit (CPU) 102, a memory unit 104 and at least one network adapter 106 interconnected by a system bus 110. The memory unit 104 may comprise storage locations typically composed of random access memory (RAM) devices, which are addressable by the CPU 102 and network adapter 106. An operating system, portions of which are typically resident in memory and executed by CPU, functionally organizes the entity by, inter alia, invoking network operations in support of processes executing in the CPU.

The computer network media included within system 100 may comprise any of various types of media, including Ethernet, FDDI or token ring local area network (LAN) connections interconnected by switches B–E. Communication among the entities coupled to these connections is typically effected by exchanging discrete data "packets" specifying addresses of, e.g., the source and destination end stations A and F. In particular, the function provided by each LAN switch generally comprises receiving a packet at an input port from an entity, forwarding that packet to at least one other output port and, thereafter, transmitting the packet over at least one medium to another entity of the network.

Figure 2:
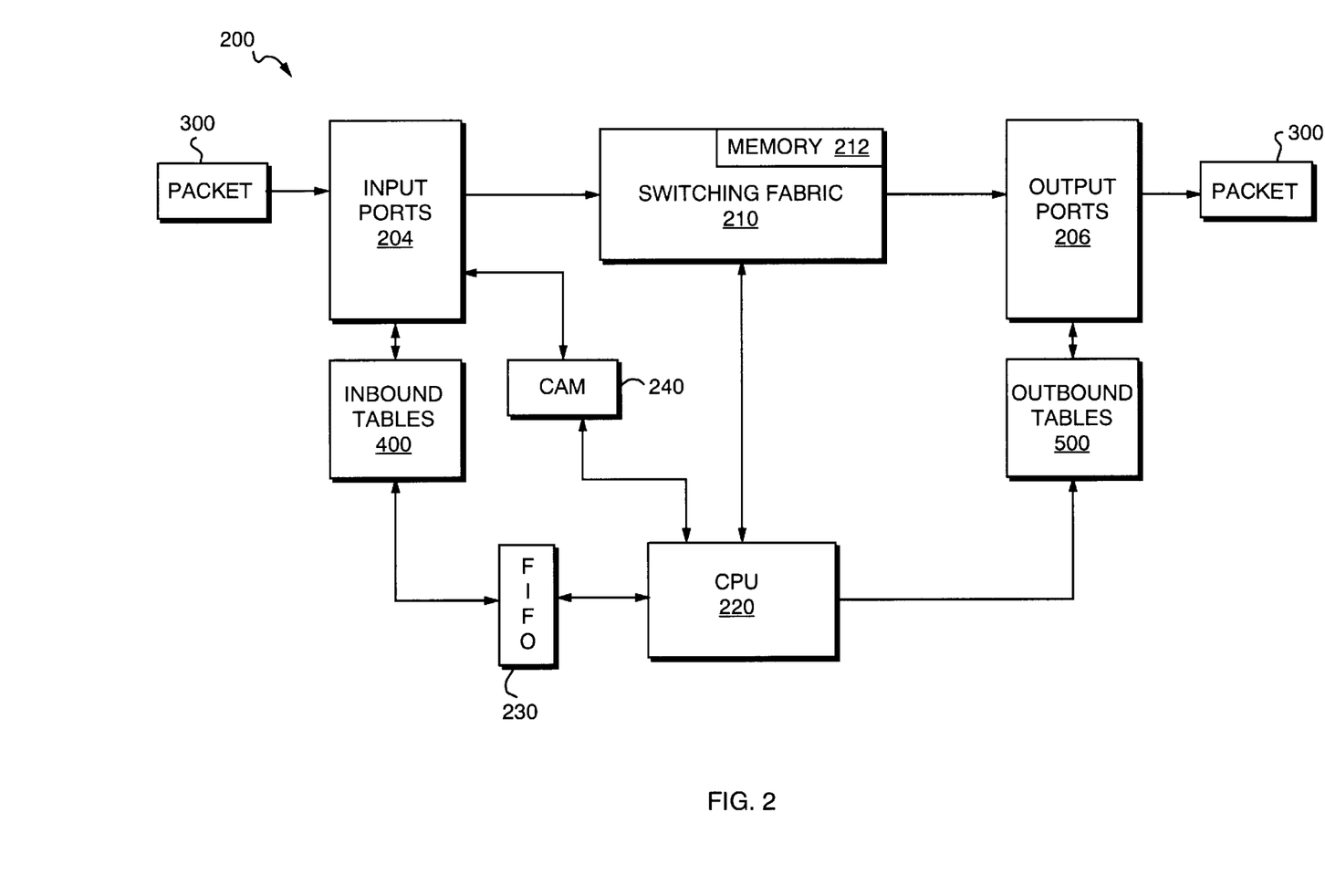
FIG. 2 is a schematic block diagram of a network switch having inbound and outbound forwarding tables that may be advantageously used with the present invention.

FIG. 2 is a schematic diagram of a network switch 200 comprising a switching fabric circuit 210 for transferring information among input ports 204, output ports 206 and a CPU 220. In the illustrative embodiment, there are preferably thirty-one (31) input ports and thirty-one (31) output ports, each of which is configured to couple the switch 200 either to an end station via a link 112 or to another switch via a trunk 120. The input and output ports may comprise customized logic circuits, whereas the switching fabric circuit 210 may comprise a shared-memory or shared-medium switching fabric. The network operations executed by the CPU and logic circuits may further comprise packet encapsulation and forwarding table operations in connection with software switching processes executing on the switch 200.

Coupled to the input and output ports are inbound and outbound forwarding tables 400 and 500, respectively. As described further herein, these forwarding tables contain routing information indicating where to forward the information received at the switch. The received information are preferably transferred among the ports and CPU by the switching fabric 210 as a plurality of fixed-length encapsulated data elements or packets.

Figure 3:
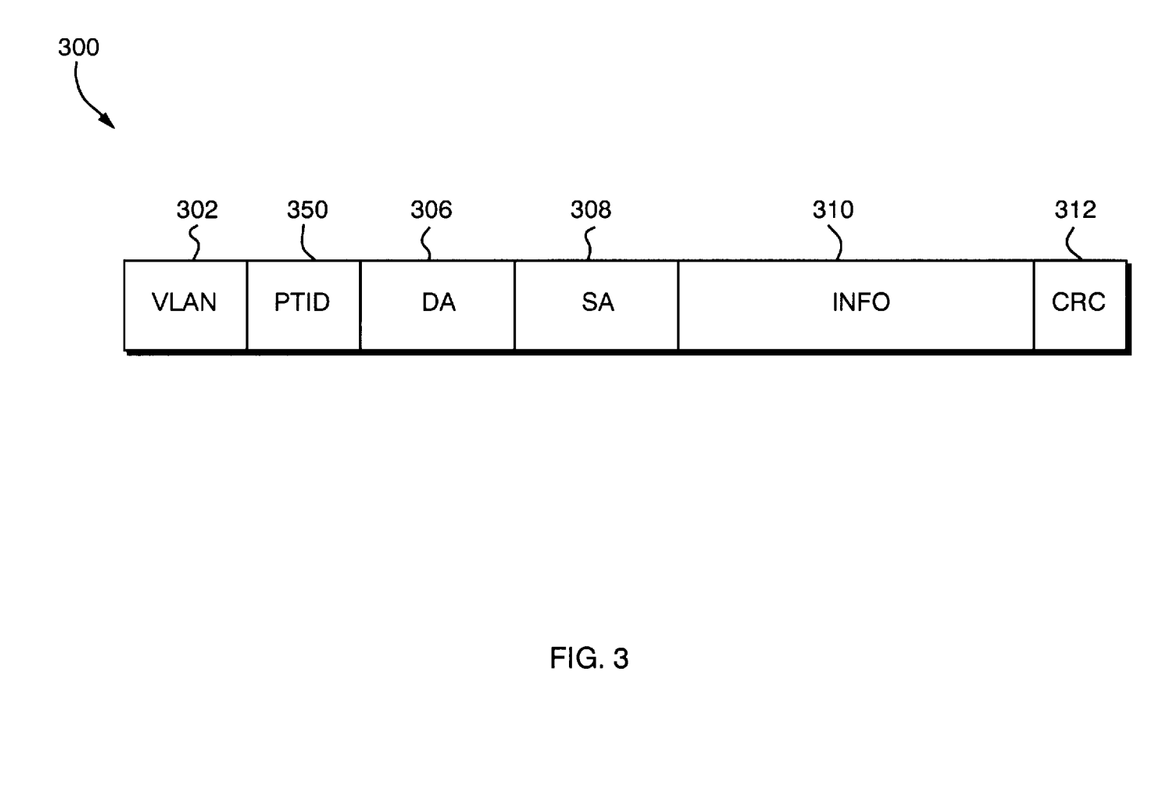
FIG. 3 is a block diagram illustrating the format of a packet encapsulated with a path identifier tag in accordance with the invention.

FIG. 3 illustrates the format of an encapsulated packet 300. The packet contains a 48-bit destination address (DA) in field 306 that identifies the destination network address of the packet, a 48-bit source address (SA) in field 308 identifying the source network address of the packet, packet data (INFO) in field 310 and error control information (CRC) in field 312. In addition, an appended field 302 of the packet may contain, e.g., a virtual local area network (VLAN) identifier that is associated with each port of the switch; use of such VLAN designations is disclosed in U.S. Pat. No. 5,394,402, issued on Feb. 28, 1995 to Floyd E. Ross entitled *Hub for Segmented Virtual Local Area Network with Shared Media Access.*

Figure 4:
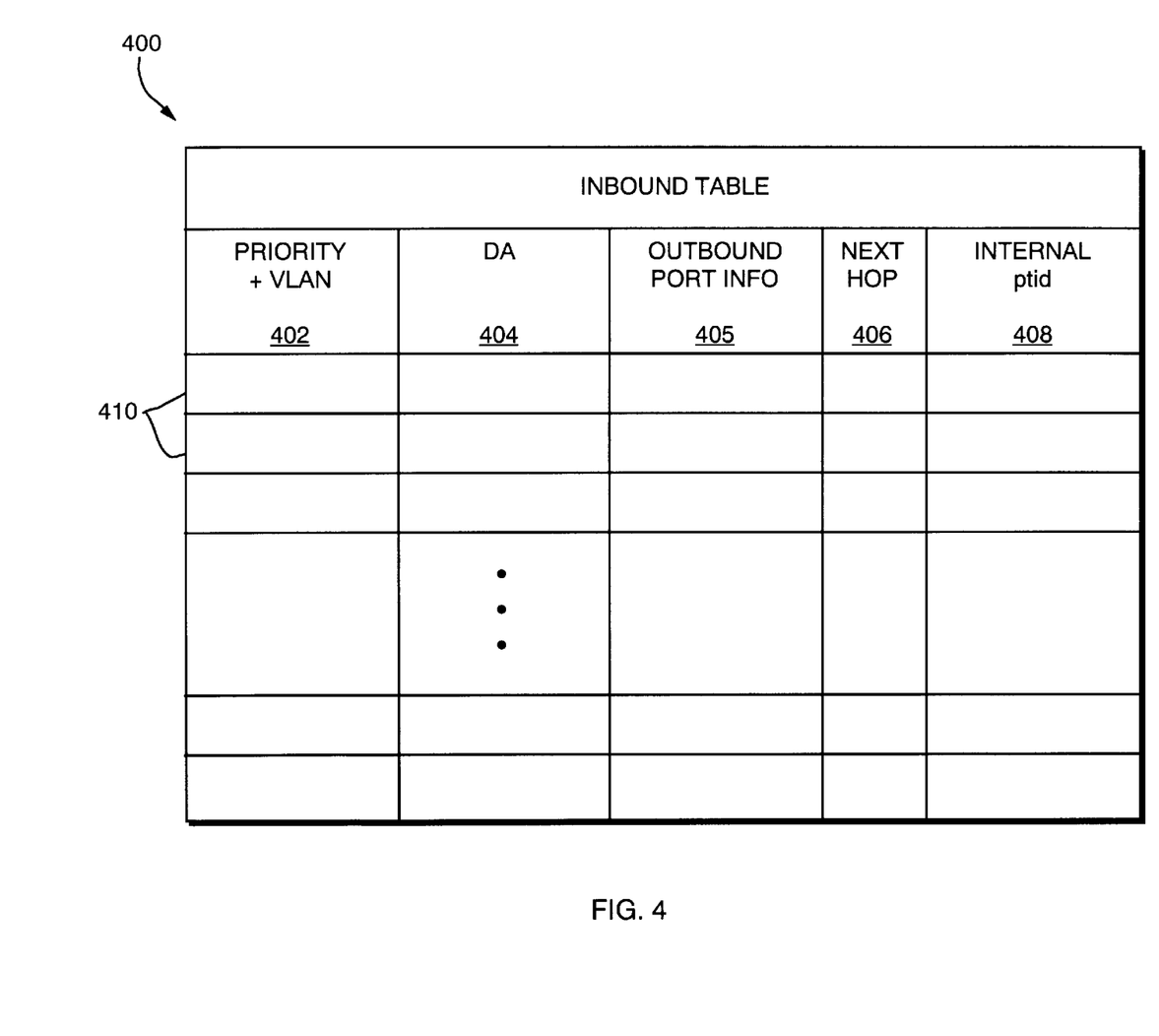
FIG. 4 is a schematic diagram illustrating the contents of the inbound forwarding table of FIG. 2.

In accordance with the invention, a novel arrangement is further provided that facilitates rendering of forwarding decisions for packet 300 transferred between high-speed switches of a network using a path identifier (PTID) appended to the packet. The PTID is stored in a field 350 and comprises a tag value associated with the DA 306 of the packet. Significantly, the PTID uniquely identifies a corresponding entry of the inbound forwarding table 400. Rather than requiring a full look-up of the destination address within the contents of the forwarding table, the PTID is used as a direct index address into the table to identify the corresponding entry in a fast and efficient manner.

FIG. 4 is a schematic diagram illustrating the contents of the inbound forwarding table 400. The inbound table is associated with each input port 204 of the switch 200 and includes a plurality of entries 410, each having a plurality of fields. These inbound table entry fields include a field 402 for storing priority (and possibly VLAN information) associated with a particular input packet. Priority information generally comprises a plurality of flags representative of at least two states: a high priority level and a low priority level. These levels specify a class of service provided to the input packet by the switching fabric 210 when executing forwarding operations within the switch.

Each table entry 410 also contains a DA field 404 for storing a 48-bit destination address of the packet and a field 405 for storing outbound port information. The contents of this latter field specify those output ports selected to receive the input packet. In the illustrative embodiment, the outbound port information may comprise a 32-bit mask value where each bit of the mask corresponds to one of the 31 output ports of the switch along with the CPU 220. The remaining fields of each entry are a field 406 for storing next-hop information pertaining to the network entity destined to receive the input packet and, as described further below, a field 408 for storing internal ptid tags. The next-hop information comprises an external ptid tag for tagging a packet destined to another interpreting switch, i.e., the "next hop". The external ptid tag is typically different from the internal ptid tag and, unlike the latter tag, not re-translated via the outbound table.

As noted, the PTID uniquely identifies a corresponding entry 410 of the inbound forwarding table 400. According to an aspect of the invention, this PTID tag is assigned solely by a switch configured to interpret the PTID tag. That is, an interpreting switch generates and encapsulates the PTID within field 350 of packet 300 prior to forwarding it to a learning switch. In response to receipt of the packet, the learning switch "learns" and associates both the destination address and the assigned PTID with the interpreting switch, preferably under control of CPU 220. Thereafter, all packets destined for this interpreting switch from the particular learning switch are encapsulated with the assigned PTID.

According to another aspect of the invention, the interpreting switch assigns a value for the PTID based on the availability of an entry in the inbound table 400. For example, a 2-byte PTID tag specifies 64K unique PTID values. Since the PTID is used as a direct index address into the table 400 to quickly identify a corresponding table entry, each of the 64K PTID values is an address of a unique table entry 410. The interpreting switch assigns a PTID value to a destination address of a packet based on the availability of an entry 410. This allows each interpreting switch that will interpret the PTID tag to efficiently manage the size of its forwarding table and the overhead to establish destination address associations. It should be noted that each PTID tag is associated with a single destination address.

Figure 5:
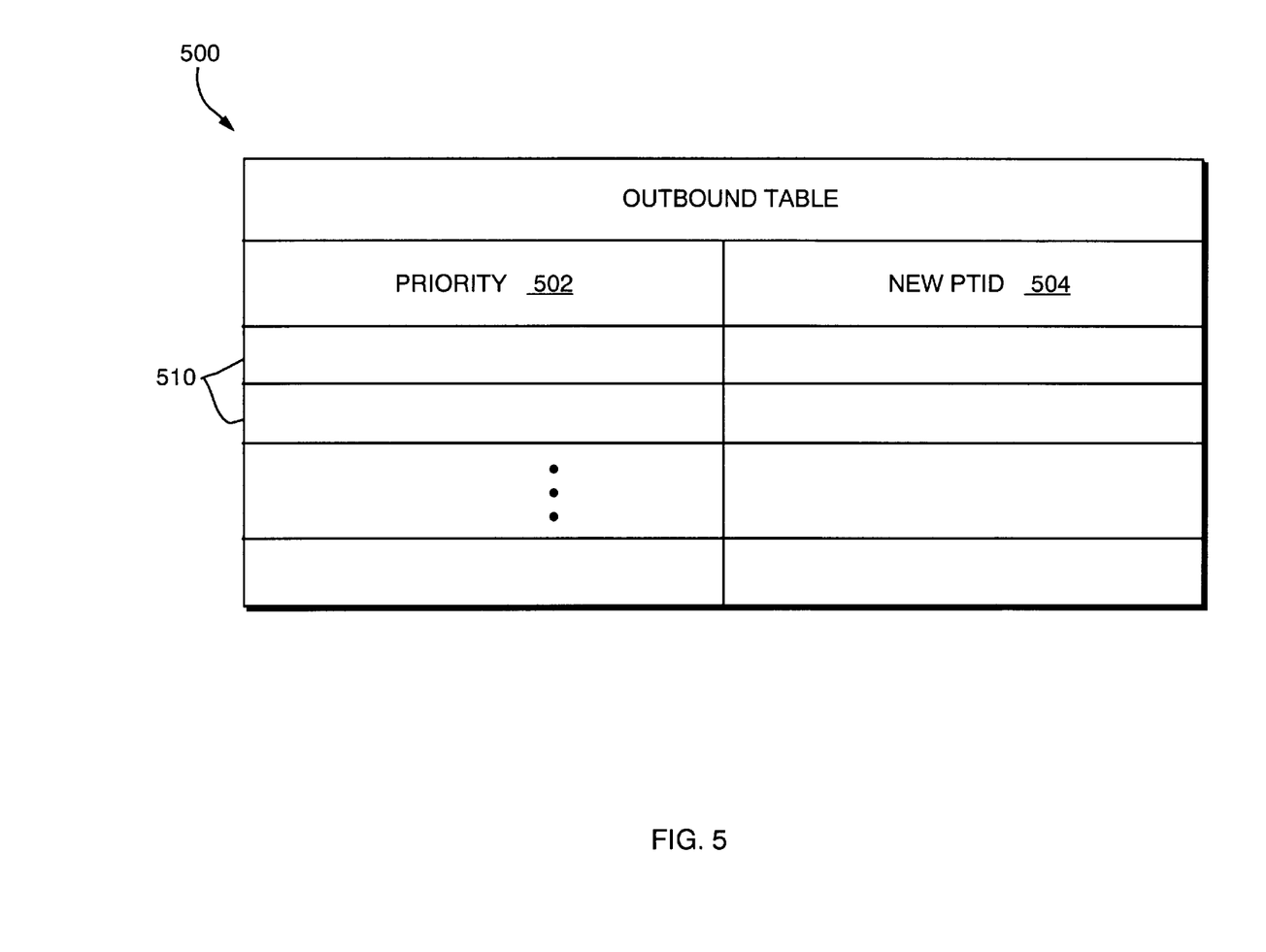
FIG. 5 is a schematic diagram illustrating the contents of the outbound forwarding table of FIG. 2.

According to yet another aspect of the invention, field 408 of the inbound forwarding table 400 stores an internal ptid tag that is used as a direct index address into the outbound forwarding table 500 associated with an output port 206 of the switch 200. Preferably, the internal ptid tag is employed when the input packet is destined for multiple output ports; in this case, the ptid tags decouple indexing into the outbound tables of the selected ports from addressing of the inbound table in the event that a copy of the packet destined for one of the output ports has been assigned a new PTID tag by its interpreting switch that is different from the tag assigned to another copy of the packet by another interpreting switch. That is, translation of the internal ptid to new PTID tag occurs only when an input packet is forwarded to multiple-ports because the newly assigned PTID of an output packet may be different for each output link/trunk coupled to each interpreting switch.

FIG. 5 is a schematic diagram illustrating the contents of the outbound forwarding table 500 which includes a plurality of entries 510, each having a plurality of fields. These fields include a field 502 for storing information pertaining to the priority of the output packet and a field 504 for storing a new PTID tag for the output packet prior to transmission over the network. As noted, this new PTID tag is preferably assigned by the switch receiving the output packet.

In the illustrative embodiment, each entry 510 of the outbound forwarding table 500 holds two (2) bytes of information; accordingly, 4K entries of table 500 may be implemented in a 4K×16 random access memory (RAM) device. Similarly, each entry 410 of the inbound forwarding table 400 holds up to sixteen (16) bytes of information such that a 3.5K entry table 400 may be implemented in a 28K×16 RAM. Alternately, the inbound and outbound forwarding tables may be implemented in a 32K×16 RAM that is shared between the input and output ports of the switch.

Referring again to the embodiment shown in FIG. 2, a memory element 240 is provided at the input port side of the switch 200 to facilitate rendering of forwarding decisions for packets having destination addresses known to the CPU, but unknown by the input port. These packets are "unknown" primarily because they have not yet been assigned PTID tags by their interpreting switches. The memory element is preferably a content addressable memory (CAM) having a predetermined number of entries, each of which contains fields for storing information similar to that stored in the inbound table entries 410. When the PTID of the packet is unknown to the input port 204, a full destination address compare operation is perform with all entries of the CAM, preferably during the learning process.

Figure 6A:
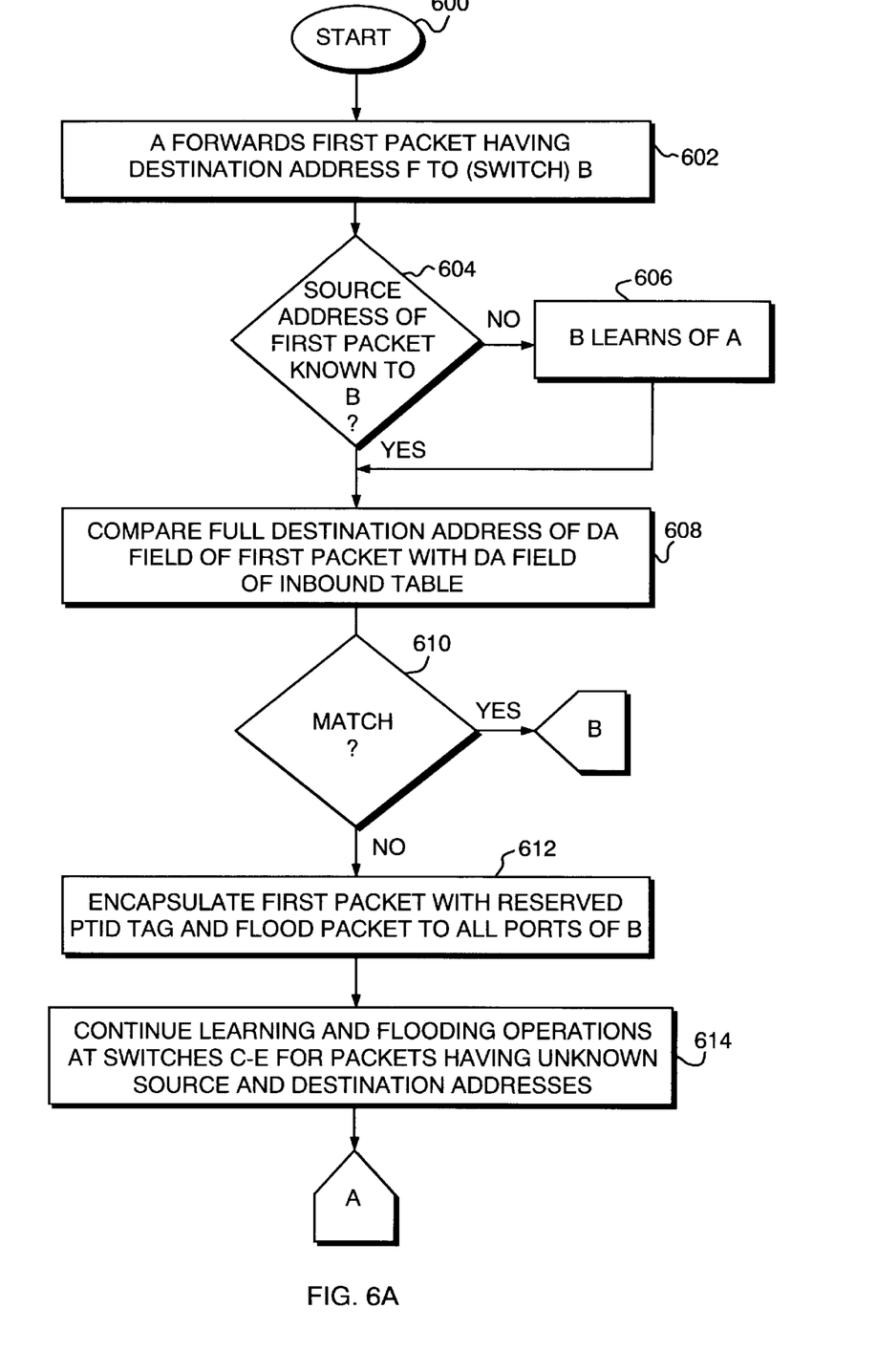
FIGS. 6A–6C are flowcharts illustrating the operation of a novel forwarding decision arrangement in accordance with the present invention.
Figure 6B:
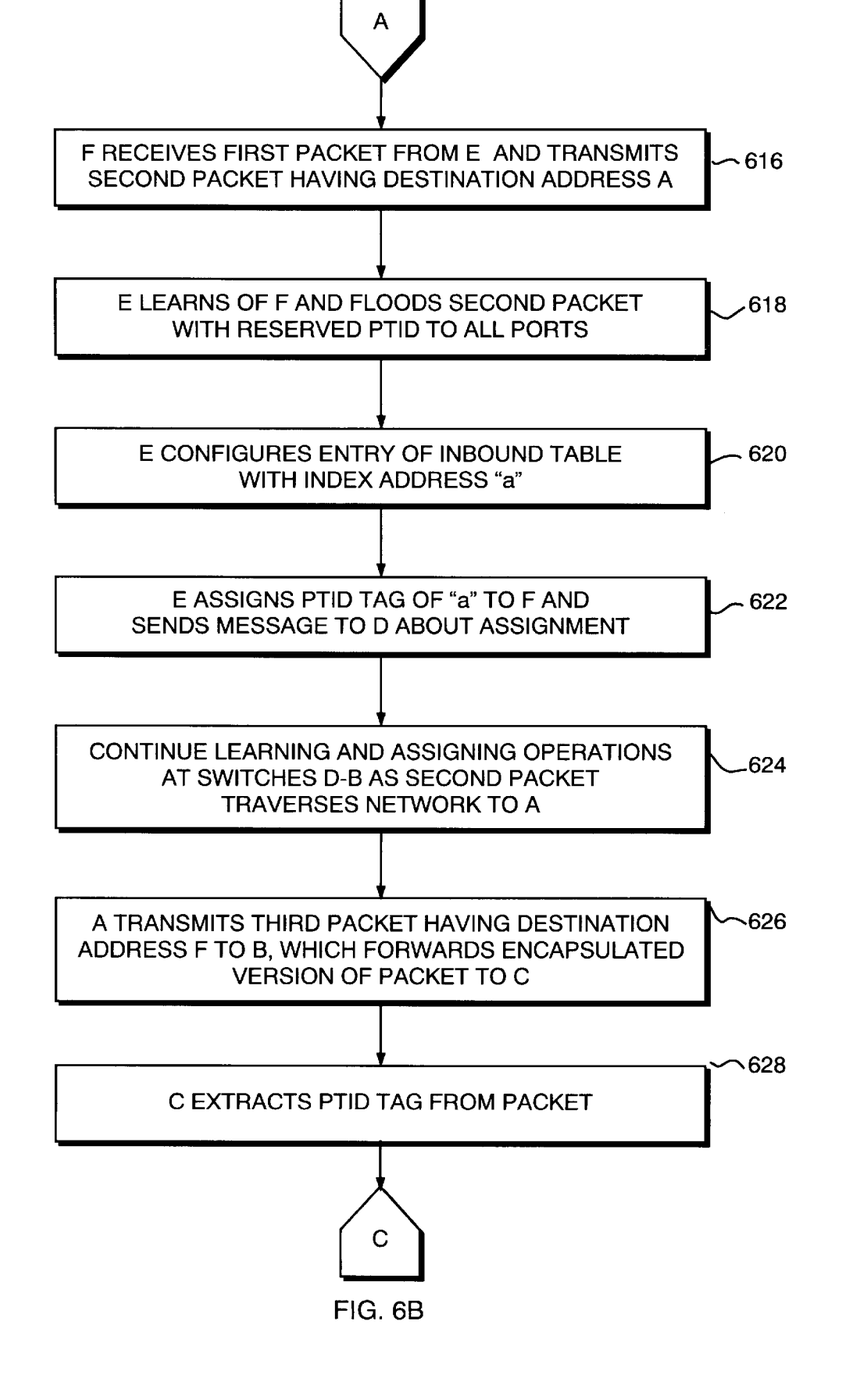
Figure 6C:
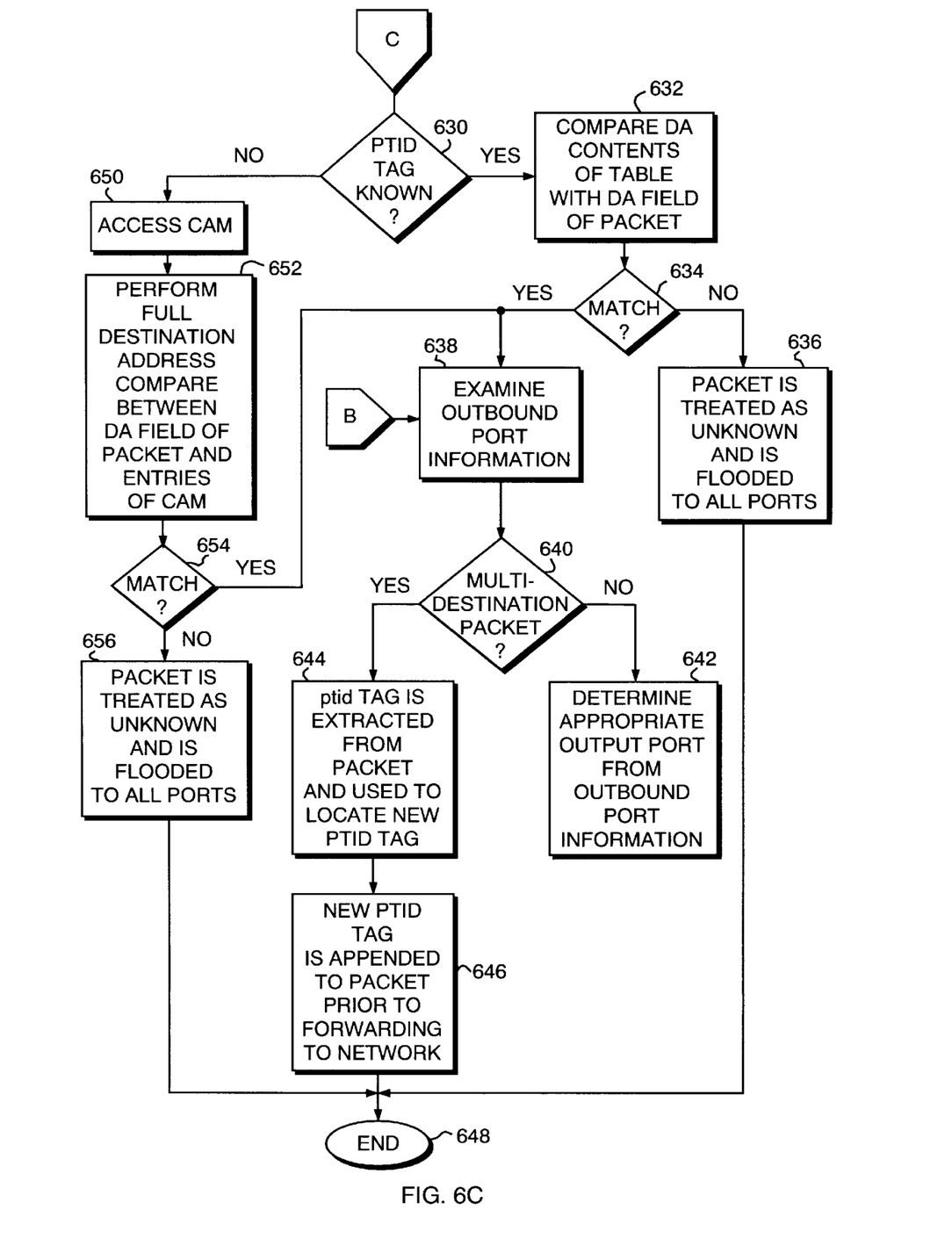

Operation of the novel forwarding decision arrangement will now be described in connection with the flowcharts of FIGS. 6A–6C and with reference to FIGS. 1–5. The operational sequence begins at Step 600 and proceeds to Step 602 where end station A forwards a first packet having a destination address of F to switch B over link 112 of the network 100. Since the transmitting entity is an end station, the first packet is received at an input port 204 of the switch without an encapsulated PTID tag. At Step 604, the contents of the SA field 308 of the first packet are examined to determine whether end (source) station A is known to switch B. If station A is unknown, switch B "learns" of station A in Step 606 in accordance with a conventional bridge learning technique, such as that set forth in IEEE Standard 802.1D.

If station A is known (or now learned), switch B then performs a full destination address compare between the contents of the DA field 308 of packet 300 and the field 404 of each entry 410 of inbound table 400 in Step 608; in Step 610, a determination is made as to whether there is a match. If so, the sequence jumps to Step 638 described herein; otherwise, the first packet is encapsulated with a reserved ("unknown") PTID tag and flooded to all ports of the switch in Step 612. The learning and flooding operations described above are then executed at each of the remaining switches C–E when encountering packets having unknown source and destination addresses (Step 614).

In response to the flooding operation performed at switch E, end (destination) station F receives the first packet and transmits a second packet having a destination address of A at Step 616. Upon receiving this packet, switch E learns of station F in Step 618 and floods the second packet (encapsulated with the unknown PTID tag) to all of its ports. Switch E then configures an entry 410 of inbound table 400 associated with the input port coupled to switch D with an index address of "a" (Step 620) and loads the destination address "F" into that entry's DA field 404. In addition at Step 622, switch E assigns a PTID tag "a" to station F and sends a message to switch D notifying that latter switch of the assignment. This sequence of events continues for the switches D–B in Step 624 as the second packet traverses the entitites of network 100 to station A.

In Step 626, station A has transmitted a third packet having a destination address of F to switch B, which has then forwarded an encapsulated version of the packet to switch C over trunk 120. At switch C, the PTID tag 350 is extracted from the packet (Step 628) and examined to determine whether it may be used to address a corresponding entry of inbound table 400 (Step 630). If the PTID is known and, thus is used to locate a corresponding entry 410, the DA contents 404 are compared with the contents of DA field 306 (Step 632). In Step 634 it is determined whether the destination addresses match and if they do not, the destination of the packet is treated as unknown and the packet is flooded to all output ports in Step 636; the sequence then ends at Step 648. However, if the contents of the DA fields do match, the outbound port information 405 is examined in Step 638. In Step 640 it is determined whether the packet is a multi-destination packet destined for multiple output ports and, if not, the outbound port information is used in Step 642 by the switching fabric circuit 210 to deliver the packet to the appropriate output port 206. Included within this operation may be use of the priority information of field 402 to deliver the packet in accordance with the priority level specified therein.

If the packet is a multi-destination packet, each internal ptid tag 408 is used to encapsulate a copy of the packet provided to each of those ports. The internal ptid tag is extracted from the packet by the output port in Step 644 and used to identify an entry of the outbound table containing a new PTID tag. In Step 646, this latter tag is appended to the packet prior to forwarding onto the network. The sequence then ends at Step 648.

Returning to Step 630, if the PTID is unknown and therefore unable to address an entry 410 of the inbound table 400, then the switch may optionally access the CAM 240 in Step 650. As noted, a full destination address compare operation is perform between the contents of the DA field 306 of the packet and all entries of the CAM in Step 652. In Step 654 it is determined whether there is a match between the destination addresses and, if there is, the operations starting at Step 638 are followed; otherwise, the destination of the packet is treated as unknown and the packet is flooded to all output ports, as specified in Step 656. The sequence then ends at Step 648.

While there has been shown and described illustrative embodiments for implementing a novel arrangement that facilitates rendering of forwarding decisions for a packet transferred between high-speed switches of a network using a novel PTID tag, it is to be understood that various other adaptations and modifications may be made within the spirit and scope of the invention. For example, the novel arrangement may be employed between different elements of a single, large switch. Here, an outbound table associated with an output port distinguishes packets received from different input ports on the basis of the packets' internal ptids. The output ports would effectively have a separate outbound table for each input port; this outbound table is accessed by an index comprising the combination of the internal ptid tag and input port number. Information pertaining to the input port transmitting the packet is provided over the switching fabric. Accordingly, input ports may encapsulate their packets with similar PTID tags without further coordination among those ports.

In yet another embodiment of the invention, an independent out-of-band data path, e.g., a data structure, is provided for transferring "learning" information to the CPU. Referring to FIG. 2, this data structure 230 is separate and distinct from the in-band data paths of the switching fabric circuit 210 used to forward typical CPU-destined packets. The out-of-band data structure 230 may comprise, e.g., a FIFO or queue, which the CPU 220 periodically polls or which interrupts the CPU when there is, e.g., learning information that affects the contents of the table 400. Use of such an out-of-band data transfer allows prioritization of packets forwarded to the CPU, particularly for purposes of updating the forwarding tables and notifying other switches of the updates.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. In a communications network, an arrangement comprising:
A) a first switch that includes a first-switch port from which the first switch forwards packets, each of a plurality of said packets including a path-identifier field and link-level destination- and source-address fields; and
B) a second switch comprising:
 i) a plurality of second-switch ports, including second-switch output ports and a second-switch input port coupled to the first-switch port;
 ii) a forwarding table into which the second switch places at each of a plurality of table locations therein a respective entry that associates a respective link-level address with a second-switch output port at which the second switch has received a packet that included a source-address field containing that link-level address, each table location being represented by a respective index address; and
 iii) means for fetching the table entry at the table location represented by the contents of the path-identifier field of each of said plurality of packets forwarded from said first-switch port and received at the second-switch input port and, if that entry associates a given second-switch port with the contents of that packet's destination-address field, forwarding that received packet from the given second-switch port.

2. The arrangement of claim 1 wherein the means for fetching the table entry and forwarding the received packet comprises a processing unit coupled to a switching fabric circuit.

3. The arrangement of claim 2 wherein the forwarding table is an inbound table and the second switch further comprises at least one outbound table comprising a plurality of outbound-table entries at respective table locations therein represented by respective index addresses, and wherein the switching fabric circuit comprises one of a shared memory fabric and a shared medium fabric.

4. The arrangement of claim 3 wherein the inbound table is associated with the second-switch input port and wherein the table entries are inbound-table entries included in the inbound table, each inbound-table entry containing (i) a destination-address field containing the link-level address with which that inbound-table entry associates a second-switch port, (ii) an outbound-port-information field and (iii) an internal-PTID field.

5. The arrangement of claim 4 wherein the contents of a given inbound-table entry's outbound-port-information field specifies the second-switch output port that the given table entry associates with the contents of the destination-address field.

6. The arrangement of claim 4 wherein the second switch includes a plurality of said second-switch output ports associated with a respective said outbound tables and wherein the contents of the internal-PTID field are employed where the packet is destined for multiple output ports, the contents of the internal-PTID field being used as an index address into the outbound table associated with at least one of the second-switch output ports.

7. The arrangement of claim 6 wherein:

one said second-switch output port is coupled to a third switch; and each outbound-table entry in the outbound table associated with said one second-switch output port contains at least one field for storing a new PTID assigned by the third switch.

8. The arrangement of claim 7 further comprising a memory element coupled between the processing unit and the second-switch input port for facilitating rendering of the forwarding decision at the second-switch input port for the packet when the destination address is known to the processing unit but unknown by the second-switch input port.

9. The arrangement of claim 8 wherein the memory element is a content addressable memory having a predetermined number of entries, each of which contains fields for storing information similar to that stored in the inbound table entries.

10. The arrangement of claim 8 further comprising an out-of-band data path for transferring predetermined information to the processing unit.

11. The arrangement of claim 10 wherein the out-of-band data path is one of a first-in, first-out buffer and a queue buffer, and wherein the processing unit either periodically polls the buffer or is interrupted by the buffer in response to the transferred predetermined information.

12. A method for facilitating rendering of a forwarding decision for a packet transferred from a first switch to a destination station via a second switch of a network, which second switch includes second-switch output ports and a second-switch input port coupled to the first switch, the method comprising the steps of:

configuring a forwarding table, associated with the second-switch input port, that includes at each of a plurality of table locations therein a respective table entry that associates a respective link-level address with a second-switch output port at which the second switch has received a packet that included a source-address field containing that link-level address, each table location being represented by a respective index address;

sending a message from the second switch to the first switch notifying the first switch of the index address that represents the location at which a table entry associates the destination station's link-level address with one said second-switch output port;

encapsulating the packet with that index address at the first switch prior to forwarding the packet to the second switch; and rendering the forwarding decision for the packet received at the second switch using that index address to locate the corresponding table entry.

13. The method of claim 12 wherein the first switch is a learning switch and the second switch is an interpreting switch, wherein the forwarding table is an inbound table, and wherein the step of configuring further includes configuring a plurality of outbound tables associated with respective ones of said second-switch output ports.

14. The method of claim 13 wherein the table entries in the inbound table are inbound-table entries and the step of configuring further comprises the steps of:

configuring each inbound-table entry with (i) a destination-address field containing the link-level address associated with that inbound-table entry, (ii) an outbound-port-information field whose contents specify the output ports of the switch selected to receive the packet and (iii) an internal-PTID field.

15. The method of claim 14 wherein one of said second-switch output ports is coupled to a third switch and the step of configuring further comprises the steps of:

configuring each outbound table to include a plurality of outbound-table entries, each having a plurality of fields; and loading, in the internal-PTID field of an entry in the outbound table associated with said one second-switch output port, a new PTID tag assigned by the third switch.

16. The method of claim 15 wherein the step of configuring further comprises the step of decoupling indexing into a selected outbound table from addressing of the inbound table in the event that the new PTID tag assigned to a copy of the packet destined for said one of said second switch output ports by the third switch is different from the tag assigned to another copy of the packet by another interpreting switch.

* * * * *